United States Patent [19]
Nabeyama et al.

[11] Patent Number: 5,859,938
[45] Date of Patent: Jan. 12, 1999

[54] OPTICAL AMPLIFIER AND OPTICAL TRANSMISSION SYSTEM

[75] Inventors: Yoshio Nabeyama, Fukuoka; Kazuyuki Tanikawa; Mitsuo Kitamura, both of Kanagawa, all of Japan

[73] Assignee: Fujitsu Limited, Kawasaki, Japan

[21] Appl. No.: 770,578

[22] Filed: Dec. 19, 1996

[30] Foreign Application Priority Data

Jun. 26, 1996 [JP] Japan .................................. 8-166472

[51] Int. Cl.$^6$ .................................................. G02B 6/28
[52] U.S. Cl. .................................................. 385/24; 372/6
[58] Field of Search .................................. 372/6; 385/24, 385/147

[56] References Cited

U.S. PATENT DOCUMENTS

| | | | |
|---|---|---|---|
| 5,173,957 | 12/1992 | Bergano et al. | 372/6 |
| 5,363,234 | 11/1994 | Mewhouse et al. | 372/6 |
| 5,455,704 | 10/1995 | Mizuochi et al. | 372/6 |
| 5,638,204 | 6/1997 | Grasso et al. | 372/6 |

FOREIGN PATENT DOCUMENTS

| | | |
|---|---|---|
| 0621663 | 10/1994 | European Pat. Off. . |
| 0647000 | 4/1995 | European Pat. Off. . |
| 61-181768 | 8/1986 | Japan . |
| 2-157829 | 6/1990 | Japan . |
| 4-246604 | 9/1992 | Japan . |
| 5-268166 | 10/1993 | Japan . |
| 2 272 102 | 5/1994 | United Kingdom . |
| 94/05061 | 3/1994 | WIPO . |

OTHER PUBLICATIONS

Patent Abstracts No. 08008955A (Jan. 12, 1996).
Patent Abstracts No. 08008820A (Jan. 12, 1996).
Patent Abstracts No. 07240713A (Sep. 12, 1995).
Patent Abstracts No. 06342948A (Dec. 13, 1994).
Patent Abstracts No. 06069579A (Mar. 11, 1994).
Patent Abstracts No. 06302889A (Oct. 28, 1994).
Absract No. 3–214681A (Sep. 19, 1991).
Abstract No. 60–248045A (Dec. 7, 1985).
Abstract No. 4–120923A (Apr. 21, 1992).
Abstract No. 62–291226A (Dec. 18, 1987).
Abstract No. 56–94850A (Jul. 31, 1981).
Abstract No. 60–260246A (Dec. 23, 1985).
Abstract No. 2–271728A (Nov. 6, 1990).
Abstract No. 3–215982A (Sep. 20, 1991).
Abstract No. 3–219686A (Sep. 27, 1991).

*Primary Examiner*—Hung N. Ngo
*Attorney, Agent, or Firm*—Staas & Halsey

[57] ABSTRACT

An optical amplifier with redundant excitation light sources for exciting a rare earth doped optical fiber such as an EDF (Erbium Dope Fiber) minimizes the loss of the excitation light so as to introduce the excitation light to the EDF effectively, though an optical coupler, which plural optical fibers for transmitting the excitation lights from plural excitation light sources are welded, is used. And, the optical amplifier keeps the total of the excitation light introduced to the EDF at a predetermined value and changes one excitation light source to the other unless the output total from the respective excitation light sources becomes zero.

24 Claims, 12 Drawing Sheets

OPTICAL AMPLIFIER AND OPTICAL TRANSMISSION SYSTEM

BACKGROUND OF THE INVENTION

1. Field of the Invention

The present invention relates to an optical fiber for amplifying an optical signal transmitted with an optical fiber and an optical transmission system, and, more particularly, to an optical amplifier which is used for a long-distance optical fiber communication system and the like and amplifies an optical signal with an optical fiber doped with rare earth element (such as erbium, Er).

2. Description of the Related Art

A long-distance optical fiber communication system with optical submarine cables across the ocean passes optical signals through optical fibers, which consists of optical cables, to transmit energy, image/audio signals and the like. Transmission units used in the optical fiber system include light-sending part for sending optical signals, relay part located suitable positions in the optical fiber cable to relay the optical signals from one transmission block to another, and light-receiving part.

An optical amplifier used for the transmission unit amplifiers only the intensity of the optical signal without changing the wavelength of the inputted optical signal. Conventionally, an optical amplifier is applied with a regenerative relay method, in which a sent optical signal is once converted to an electric signal and then the electric signal is re-converted to an optical signal. However, today, a direct optical amplification method is used with the advance of technology for amplifying optical signals directly. An optical amplifier, which amplifiers optical signals directly as mentioned, is usually provided with a optical fiber doped with rare earth element (lanthanoid, actinoid, erbium or the like) as amplification media and a semiconductor laser diode for exciting the rare earth doped optical fiber. In this optical amplifier, a sent optical signal is amplified with the rare earth doped optical fiber excited with the semiconductor laser diode.

FIG. 12 is a block diagram showing one example of a conventional optical amplifier.

The optical amplifier 1, as shown in FIG. 12, is provided with a quartz optical fiber Fib1 used as a transmission medium at the input side, an optical fiber Fib2 at the output side, an erbium(Er) doped optical fiber EDF (erbium doped fiber) used as an amplification medium, an excitation light source LD consisting of a high-power semiconductor laser diode for exciting EDF, a control circuit for controlling the excitation light source LD, an optical fiber Fib3 for transmitting a excitation light outputted from the excitation light source LD, an optical multiplexer WDM (Wavelength Division Multiplexer) for multiplying the excitation light from the excitation light source Ld and the input optical signal from the optical fiber Fib1 at the input side.

In the optical amplifier 1, an input light L1 transmitted through the optical fiber Fib1 at the input side to be a main signal is amplified with the EDF and then outputted through the optical fiber Fib2 at the output side as an output light L2.

The excitation light source LD is, for example, an InGaAsP/InP laser diode of about 1475 nm in oscillation wavelength or an InGaAs laser diode with oscillation wavelength of 980 nm. The excitation light outputted from the excitation light source LD is sent to the optical multiplexer WDM through the optical fiber Fib3.

The optical multiplexer WDM is an optical circuit element for multiplying the excitation light from the excitation light source LD and the input light L1 at the main signal side, of which wavelengths are different, and is provided between the EDF and the optical fiber Fib3 at the output side. The excitation light from the excitation light source LD with the wavelength which is different from that of the input light L1, is introduced to the EDF through the optical Multiplexer WDM.

The erbium (Er) doped in the EDF becomes in a excited state with the introduced excitation light and amplifies a light with a wavelength from 1520 nm to 1570 nm. The input light L1 with a wavelength of 1558 nm is amplified in the EDF and then outputted as the output light L2.

Now, when the excitation light source LD degrades or has a fault because of a long usage or the like, a necessary excitation light can not be obtained. Then, plural excitation light sources LD are provided, and when one excitation light source LD is not usable because of degradation or a fault or the performance thereof lowers, another excitation light source LD is used, that is, a redundant configuration for excitation light sources LD is applied to a optical amplifier.

FIG. 13 is a block diagram showing an optical amplifier 2 with a redundant configuration of excitation light sources.

The optical amplifier 2 shown in FIG. 13 differs from the optical amplifier 1 shown in FIG. 12, and is provided with two excitation light sources L1, L2, an optical coupler Cp for transmitting an excitation light source outputted from one of the excitation light sources L1, L2 to the optical fiber Fib3, an optical fiber Fib4 for transmitting the excitation light from the excitation light source LD1 to the optical coupler Cp, and an optical fiber Fib5 for transmitting the excitation light from the excitation light source LD2 to the optical coupler Cp.

The two excitation light sources LD1, LD2 send the excitation lights to the optical fibers Fib4, Fib5, respectively, extended from the input side of the optical coupler Cp, and are controlled by the control circuit Cn. The control circuit Cn includes a change-over switch, and when a change-over instruction is inputted by an input part not shown, the change-over switch switches the driving current supplied to one excitation light source to anther excitation light source.

The optical coupler Cp is formed by welding with the two optical fiber Fib4, Fib5 side by side, and by cutting an end at the output side of one optical fiber, for example, a top portion of the optical fiber Fib5 connected to the excitation light source Ld2. Though the excitation light is introduced to the optical coupler Cp from one of the optical fibers Fib4, Fib5 extended from the input side, the introduced excitation light is dispersed to another optical fiber at the weld portion, so that it can be transmitted to the optical multiplexer WDM through the optical fiber Fib3 extended from the output side.

Therefore, the excitation light outputted from one of the excitation light sources LD1, LD2 is transmitted to the EDF through the optical coupler Cp and the optical multiplexer WDM.

However, though an optical coupler welded with two optical fibers introduces an excitation light to any optical fiber, the introduced excitation light is diverged to the respective two optical fibers equally at the weld portion in the optical coupler. Therefore, the excitation light diverged to the optical fiber of which output side is cut breaks through the cut portion to the outside, and it causes excess loss. For example, when an optical coupler of 3 dB loss is used, there is a problem in that excess loss more than 3 dB occurs.

And, to minimize the excess loss of the light, it is considered to use a polarization-dependence-type coupler in which a polarization direction is adjusted not to break through a light from a cut portion, however, it is a problem in that the polarization-dependence-type coupler is not suitable for an optical fiber in which a polarization condition varies in accordance with outside factors such as temperature and vibration, and is very expensive.

Further, in an optical amplifier with a redundant configuration of excitation light sources, there is a problem in that an output value of an excitation light introduced to an EDF becomes zero temporarily when an excitation light source to output an excitation light is switched from one light source to another.

SUMMARY OF THE INVENTION

Accordingly, the present invention is achieved in view of the above situation, and it is a first object of the present invention to provide an optical amplifier with a redundant configuration of excitation light sources for exciting an rare earth doped optical fiber such as an EDF, wherein loss of a excitation light is minimized so as to introduce the excitation light to the EDF efficiently without using a special element such as a polarization-dependance-type coupler and in spite of using an optical coupler welded with plural optical fibers for transmitting excitation lights from plural excitation light sources.

And, it is a second object of the present invention to provide an optical amplifier, wherein, in spite of a redundant configuration of excitation light sources, an output total of excitation lights introduced from the respective excitation lights is kept at a predetermined value without becoming zero when one excitation light source is switched to another to output the excitation light.

To achieve the first object, an optical amplifier according to this invention is provided with a rare earth doped optical fiber, a first excitation light source and a second light source, an optical coupler, a first excitation light introduction part and a second excitation light introduction part. The rare earth doped optical fiber is excited by excitation lights and amplifies an inputted optical signal so as to output. The first excitation light source and a second light source output the excitation lights. The optical coupler puts the excitation lights outputted from the first excitation light source and the second excitation light source together and divides into at least two divided excitation light. The first excitation light introduction part introduces one of the divided excitation lights into one end of the rare earth doped optical fiber. The second excitation light introduction part introduces another of said divided excitation lights into another end of said rare earth doped optical fiber.

And, the optical amplifier may comprises: a excitation light branch part for branching said excitation lights outputted from the excitation light source and the second excitation light source; a optical/electric signal conversion part for converting a branched excitation light branched by the excitation light branch part into an electric signal; and, a control part for controlling the first excitation light source and the second excitation light source in a manner that the electric signal converted by the optical/electric signal conversion part becomes a stationary value.

Further, in the optical amplifier, the rare earth doped optical fiber, the optical coupler, the first excitation light introduction part and the second excitation light introduction light part are put on a first substrate; the first excitation light source is put on a second substrate; the second excitation light source is put on a third substrate; the second substrate and said first substrate are freely attachable and detachable and the third substrate and said first substrate are freely attachable and detachable.

To achieve the second object, in the optical amplifier according to this invention, the control part comprises, a power circuit and a time stationary circuit. The power source adjusts the electric signal so as to be a stationary value and supplies currents to the first excitation light source and the second excitation light source. The time stationary circuit, when one excitation light source is changed over to other excitation light source, controls the power circuit in a manner that a current supplied to the one excitation light source is decreased gradually from a change-over time in a predetermined time and in a manner that a current supplied to said other excitation light source is increased gradually from said change-over time in said predetermined time.

And, the control part in the optical amplifier according to this invention comprises a power circuit and a switch circuit. The power circuit adjusts the electric signal so as to be a stationary value and supplies currents to the first excitation light source and the second excitation light source. The switch circuit controls the power circuit so as to function in a state selected among a first state in that currents supplied to the first excitation light source and the second excitation light source are set to a predetermined amount, respectively, a second state in that a current supplied to the first excitation light source is set to twice the predetermined amount and a current supplied to the second excitation light source is set to zero and a third state in that the current supplied to the first excitation light source is set to zero and the current supplied to the second excitation light source is set to twice the predetermined amount.

BRIEF DESCRIPTION OF THE DRAWINGS

The present invention will become more fully understood from the detailed description given hereinbelow and the accompanying drawings in which.

DETAILED DESCRIPTION OF THE PREFERRED EMBODIMENTS

Preferred embodiments of the present invention will now be described with reference to the accompanying drawings.

First Embodiment

Figure 1:
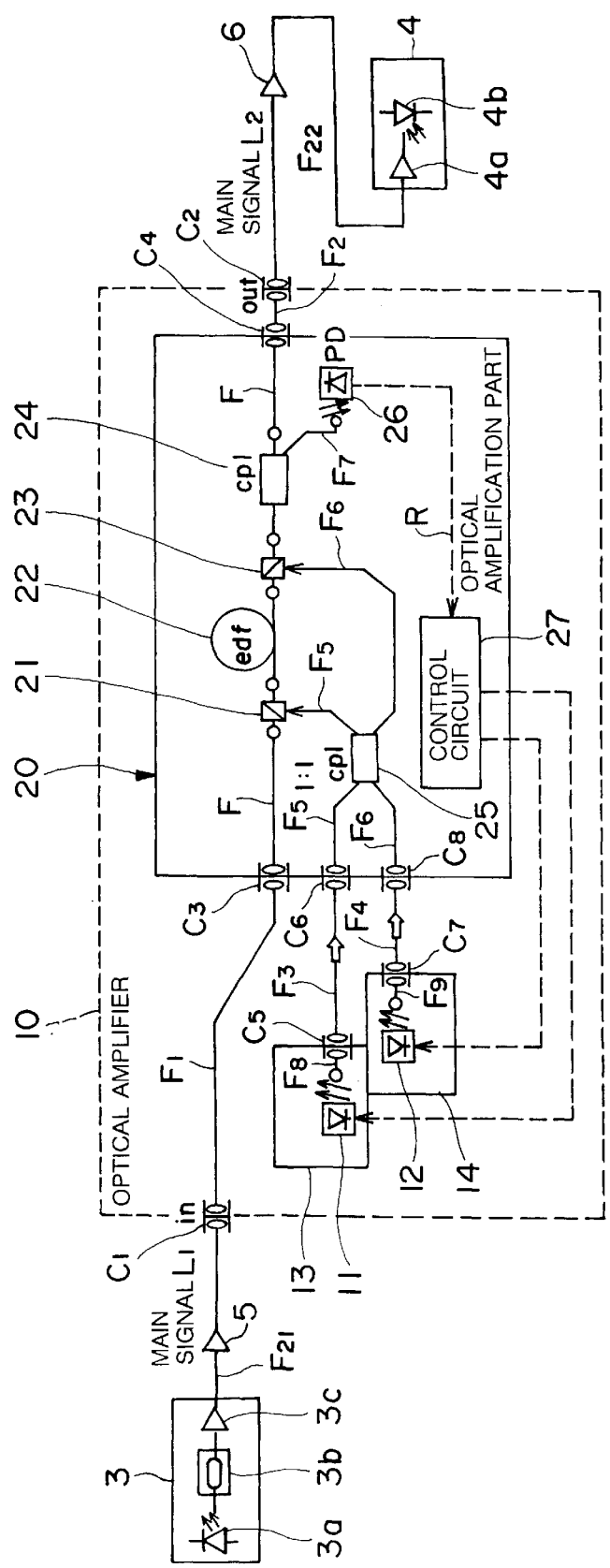
FIG. 1 is a block diagram illustrating an optical transmission system including an optical amplifier according to the first embodiment of this invention.

FIG. 1 is a block diagram showing an optical transmission system including an optical amplifier according to the first embodiment of the present invention.

An optical amplifier 10 is a repeater for directly amplifying a main signal in a long-distance optical fiber communication system, and is provided between an output terminal station 3 and a receiving terminal station 4 through optical fibers $F_{21}$, $F_{22}$, respectively. And, in-line amplifiers 5, 6 are provided in the optical fibers $F_{21}$, $F_{22}$, respectively, and amplify and transmit optical signals while making up the lowering of the optical level by the fiber loss and the like.

The output terminal station 3 is provided with a LD (laser diode) light source 3a outputting a laser light continuously, a optical modulator 3b modulating the laser light to a transmission signal (controlling on-off in the case of a digital signal), in which an optical waveguide of the Mach-Zehnder type is formed on a $LiNbO_3$ and an optical post-amplifier 3c increasing the optical level at the output side. And, the receiving terminal station 4 is provided with a pre-amplifier 4a amplifying the received optical signal and a receiving optics 4b receiving the amplified optical signal so as to produce a current into a circuit not shown, such as a PIN (Positive Intrinsic Negative) photodiode.

In this optical transmission system, the optical signal outputted from the output terminal station 3 is inputted into the optical amplifier 10 to be a repeater as a main signal L1 through the fiber $F_{21}$ and the in-line amplifier 5, and the main signal L1 is directly amplified in the optical amplifier 10 and outputted into the receiving terminal station 4 through the in-line amplifier 6 and the fiber $F_{22}$.

Now, the optical amplifier 10 is provided with an optical amplification part 20, a first excitation light source part 13 and a second excitation light source part 14. In the optical amplifier 10, three sub-substrates are mounted on one main-substrate, and the optical amplification part 20, the first excitation light source part 13 and the second excitation light source part 14 are mounted on the sub-substrates, respectively.

The optical amplifier 10 is connected with the optical amplification part 20. A main signal to be an amplification object is inputted to the optical amplification from an external unit at the input side not shown and the main signal is sent to the optical amplifier. And then, the main signal is amplified at the optical amplification part 20 and the amplified signal is outputted from the optical amplifier 10 to an external unit at the output side not shown.

The optical amplifier 10 is provided with an optical connector C1 to be connected with the external unit at the input side and an optical connector to be connected with the external unit at the output side. The optical amplification part 20 is provided with an optical connector C3 which is connected with the optical connector C1 through a quartz-type optical fiber (hereinafter, called "optical fiber") F1 so as to receive the main signal from the external unit at the input side and an optical connector C4 which is connected with the optical connector C2 so as to send the amplified main signal to the external unit at the output side.

And, the optical amplification part 20 is connected with the excitation light source parts 13, 14 through the optical fibers F3, F4, respectively, and the excitation lights from the excitation light source parts 13, 14 are sent to the optical amplification part 20.

The optical amplification part 20 is provided with optical connectors C6, C8 to introduce the excitation light from the excitation light source parts 13, 14 through the optical fibers F3, F4, and the optical amplifier 10 is provided with an optical connector C5 to introduce the excitation light from the first excitation light source part 13 and an optical connector C6 to introduce the excitation light from the second excitation light source part 13.

In the optical amplification part 20, a front optical multiplexer 21, an erbium-doped optical fiber (hereinafter, called "EDF") 22, a rear optical multiplexer 23 and a monitor optical coupler 24 are connected in order of the proceeding direction of the main signal through the optical fiber F, respectively, between the optical connector C3 and the optical connector C4, that is, on the transmission path of the main signal. And, the optical amplification part 20 is provided with an optical coupler 25 for coupling the two optical fibers F5, F6, a photo diode 26 for converting an optical signal to an electric signal and a control circuit 27 for controlling the respective excitation light source parts 13, 14. The front optical multiplexer 21 and the rear optical multiplexer 23 are connected with the two optical fibers F5, F6 extended from the output side of the optical coupler 25, respectively. The two optical fibers F5, F6 extended from the input side of the optical coupler 25 are connected with the optical connectors C6, C8, respectively.

Erbium (Er) is doped to the inside of the EDF 22, and when the Er becomes an excitation condition by the excitation light, the main signal transmitted as an optical signal are amplified without converting the optical signal to an electric signal. The main signal L1 inputted from the external unit at the input side is introduced to the optical amplification part 20 of the optical amplifier 10 through the optical connector C1 to be optically amplified by the EDF 22, and then is outputted from the optical connector C2 as the main signal L2.

The front optical multiplexer 21 and the rear optical multiplexer 23 multiplex optical signals with plural wavelengths, and these are located at the both sides of the EDF 22 and multiplex the excitation lights supplied from the optical fibers F5, F6 at the output side of the optical coupler 25 and the main signal to introduce to the EDF 22. Incidentally, the wavelength of the excitation light is different from that of the main signal.

The optical coupler 25 is a one-to-one-side-wave synthetic coupler with 3 dB loss and the two optical fibers F5, F6 are welded around the middle thereof each other. When the excitation light is inputted to the optical coupler 25 from one of the optical fibers F5, F6 extended from the input side, the optical coupler 25 divers the excitation light to both of the optical fibers F5, F6 equally and outputs the excitation light to the optical multiplexers 21, 23 equally. This type of optical coupler is usually referred to as 3 db coupler in this technical field. The construction from the output side of the optical coupler 25 to the front optical multiplexer 21 corresponds to a first excitation light introduction part and the construction from the output side of the optical coupler 25 to the rear optical multiplexer 23 corresponds to a second excitation light introduction part.

The monitor optical coupler 24 branches a part of the main signal amplified by the EDF 22 for monitoring in a degree that the main signal L2 outputted from the connector C2 is not influenced, that is, in a degree that the output of the main signal L2 can be obtained sufficiently. For example, the monitor optical coupler 24 branches the main signal in ten-to-one and sends the main signal amplified by the EDF 22 to the optical connector C4 and the photo diode 26 in a ratio of ten-to-one, and corresponds to a optical signal branch part.

The photo diode 26 is connected with the monitor optical coupler 24 through the optical fiber F7 and is connected with the control circuit 27 through a signal conductor R. The photo diode 26 converts the part of the main signal, which branched by the monitor optical coupler 24, to an electric signal so as to output to the control circuit 27, and corresponds to an optical/electric signal conversion part.

Now, a first excitation light source 11 connected with the optical connector C5 through the optical fiber F8 is located on the sub-substrate for the first excitation light source part 13. And, a second excitation light source 12 connected with the optical connector C7 through the optical fiber F9 is located on the sub-substrate for the first excitation light source part 14. The respective excitation light sources 11, 12 consist of pump-laser diodes for generating the excitation light to excite the EDF 22. Driving power is supplied to the respective excitation light sources 11, 12 from the control circuit 27 in the optical amplification part 20.

In addition, the excitation light sources 11, 12 are redundant, so that they have the same characteristics (that is, they have output lights with the same wavelength, such as 1475 nm or 980 nm), and when one breaks down, the other is used instead of that, and the broken down excitation light source is replaced for a new one while using the other. When the first excitation light source 11 is replaced, the optical fiber F8 is cut off from the optical fiber F3 at the optical connector C5 and the first excitation light source part 13 is taken off together with the sub-substrate from the optical amplifier 10. And, when the second excitation light source 12 is replaced, the optical fiber F9 is cut off from the optical fiber F4 at the optical connector C7 and the second excitation light source part 14 is taken off together with the sub-substrate from the optical amplifier 10.

Figure 2:
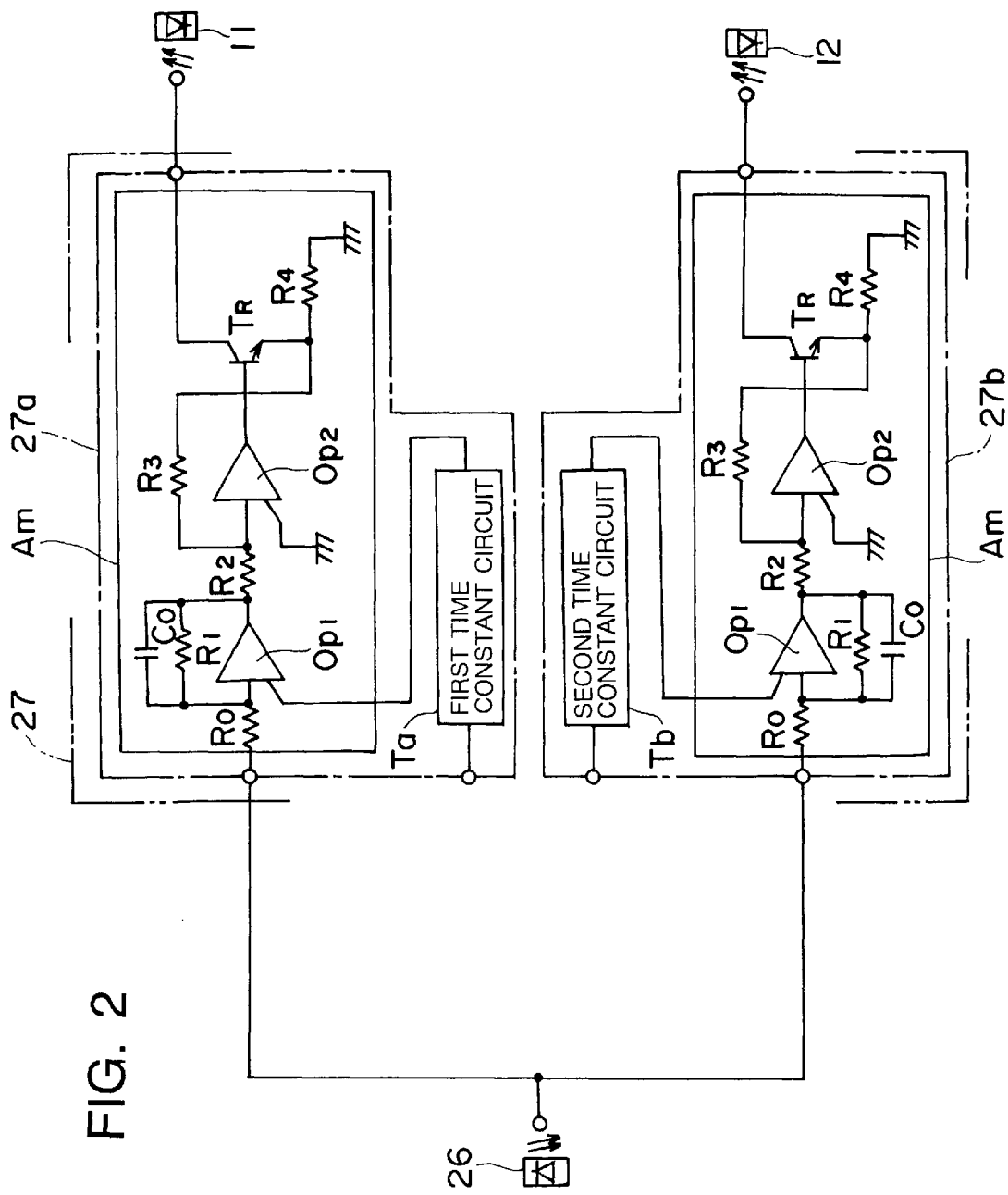
FIG. 2 is a block diagram of the control circuit shown in FIG. 1.

FIG. 2 is a structural block diagram showing the control circuit 27.

The control circuit 27 is provided with a first control part 27a connected with the first excitation light source 11 and a second control part 27b connected with the second excitation light source 12. Both of the first control part 27a and the second control part 27b are connected with the photo diode 26.

The first control part 27a is provided with a power supply circuit Am and a first time constant circuit Ta.

Figure 3:
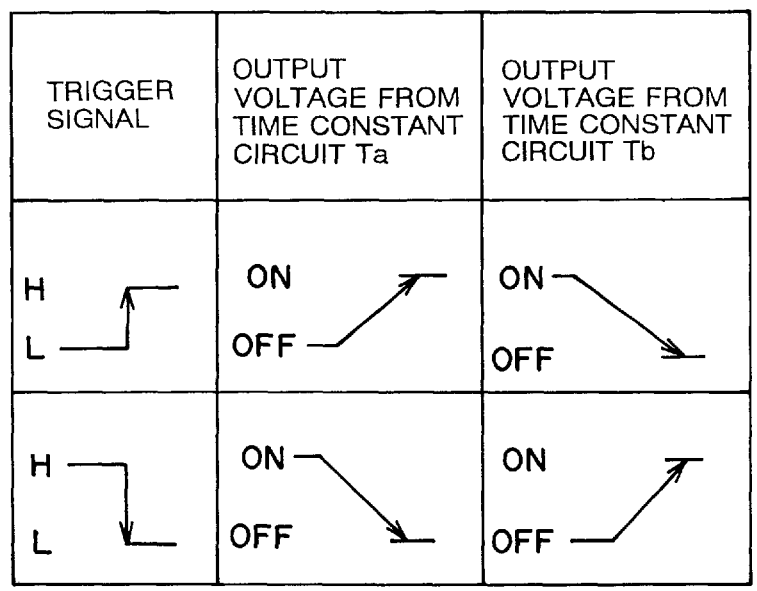
FIG. 3 is a explanatory view showing the actions of the control part and the time constant circuit shown in FIG. 2.

The first time constant circuit Ta in the first control part 27a, as shown in FIG. 3, when a change-over trigger for raising from low (L) to high (H) is inputted by a change-over operation from an input part not shown, gradually raises the output to the power supply circuit Am so that the output current of the first time constant circuit Ta becomes a stationary value after a predetermined time determined with a time constant. And, when a change-over trigger for raising from high (H) to low (L) is inputted, the output to the power supply circuit Am is fallen so that the output current of the first time constant circuit Ta becomes a stationary value after a predetermined time determined with a time constant.

The power supply circuit Am in the first control part 27a comprises of two operational amplifiers OP1, OP2. Resistances R0–R4, a capacitor Co and a transistor Tr. The output current of the photo diode 26 is applied to a non-inverting input of the operational amplifier OP1. And, the output current of the time constant circuit Ta is applied to a non-inverting input of the operational amplifier OP1. The operational amplifier OP1 raises and falls the output currents in accordance with the deference between the output currents applied to both of the inputs. The output current of the operational amplifier OP1 is applied to a non-inverting input of the operational amplifier OP2 and is amplified at a predetermined amplification rate by the amplifier composed of the operational amplifier OP2, the transistor Tr and the resistances R3, R4. The power supply circuit Am supplies the current to the first excitation light source 11 so as to raise the voltage in a manner that the output current of the photo diode 26 corresponds with the output current of the first time constant circuit Ta. As the result, when the output current of the first time constant circuit Ta is zero, the power supply circuit Am supply no current to the first excitation light source 11.

And, the power supply circuit Am, when the trigger signal for raising from low (L) to high (H) is inputted to the time constant circuit Ta, increases the current supplied to the first excitation light source 11 in direct proportion to that the output current of the first time constant circuit Ta gradually raises, so that the output current of the power supply circuit Am becomes a predetermined value which is necessary to excite after a predetermined time. Further, the power supply circuit Am, when the trigger signal for falling from high (H) to low (L) is inputted to the time constant circuit Ta, decreases the current supplied to the first excitation light source 11 in direct proportion to that the output current of the first time constant circuit Ta gradually falls, so that the output current of the power supply circuit Am becomes zero after a predetermined time.

The second control part 27b is provided with a power supply circuit Am and a second time constant circuit Tb and controls the current supplied to the excitation light source 12. Incidentally, in the second control part 27b, the same numerals in the first control part 27a are the same components, so that the explanations thereof are omitted. However, the first time constant circuit Ta in the first control part 27a operates contrary to the second time constant circuit Tb in the second control part 27b. That is, when the output current of the first time constant circuit Ta in the first control part 27a decreases, the output current of the second time constant circuit Ta in the second control part 27a increases.

Next, the explanation will be given of the operation to keep the total value of the currents supplied to the respective excitation light sources 11, 12 at a stationary value when a excitation light source to output an excitation light is changed over.

Figure 4:
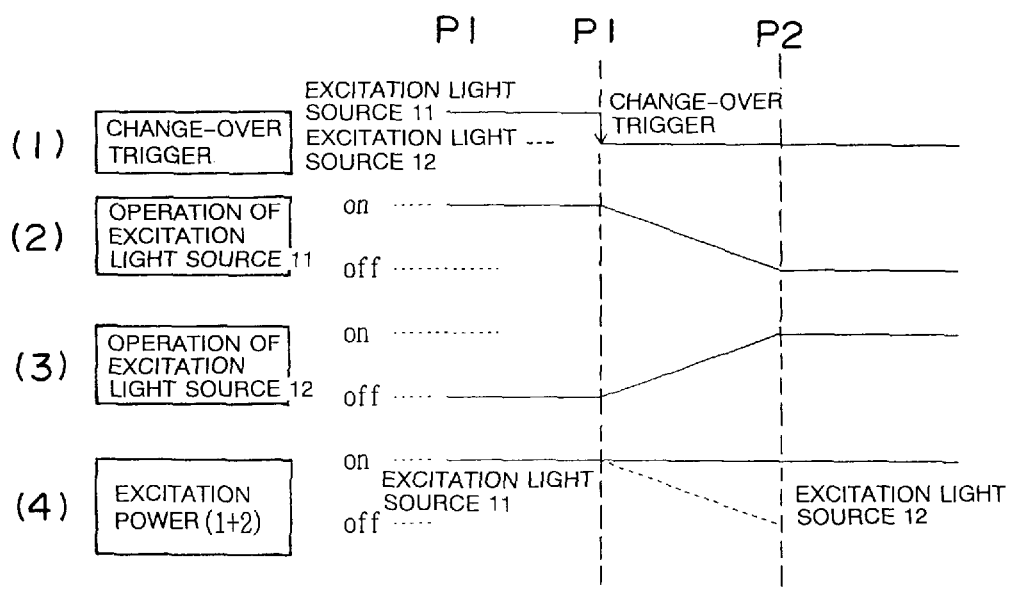
FIG. 4 is a time chart explaining the change-over action of the excitation light source shown in FIG. 1.

FIG. 4 is a time chart for explaining the operation in that an excitation light source to output an excitation light is changed over from the first excitation light source 11 to the second excitation light source 12. The explanation is given of a case in that the first excitation light source 11 is changed to the second light source 12 referring to FIGS. 2–4.

At the point P0, the excitation light is inputted from the first excitation light source 11 to the light amplification part 20. And, a part of the main signal branched by the monitor optical coupler 24 is converted to an electric signal by the photo diode 26 and the electric signal is inputted to the control circuit 27. With this arrangement, the first control part 27a supplies a constant current to the first excitation light source 11 based on the electric signal from the photo diode 26 (refer to (2) in FIG. 4). On the contrary, the second control part 27b supplies no current to the second excitation light source 12 ((3) in FIG. 4).

At the point P1, when a signal for changing the first excitation light source 11 to the second excitation light source 12, that is, a change-over trigger signal for falling from high (H) to low (L) is inputted ((1) in FIG. 4), the first time constant circuit Ta in the first control part 27a gradually decreases the output current and the second time constant circuit Tb in the second control part 27b gradually increases the output current.

Then, the first control part 27a gradually decreases the current supplied to the first excitation light source 11 from the point P1 to the point P2 and the supply current becomes zero at the point P2 ((2) in FIG. 4). On the contrary, the second control part 27b gradually increases the current supplied to the second excitation light source 12 from the point P1 to the point P2 and the current becomes the stationary value at the point P2 ((3) in FIG. 4). In addition, the control circuit 27 is supplied with a current from a circuit not shown.

As described, when the excitation light sources are changed over, the control circuit 27 controls the outputs of the respective excitation light sources 11, 12 so as to keep the output total of the excitation lights introduced to the EDF 22 at the stationary value permanently. At that time, the excitation light from the respective excitation light sources 11, 12 are introduced to the EDF 22 through the two optical fiber extended from the output side of the optical coupler 25 and the respective optical multiplexers 21, 23. After the point P2, when the output total of the excitation lights to be introduced to the EDF 22 can be kept at the stationary value with only the second excitation light source 12, the first excitation light source part 13 including the first excitation light source 11 can be replaced by new one. The first excitation light source part 13 in the first embodiment is a simple structure in that only the first excitation light source 11 is mounted on the sub-substrate, so that another parts can be made good use to be economical though all of the sub-substrate is replaced.

Figure 13:
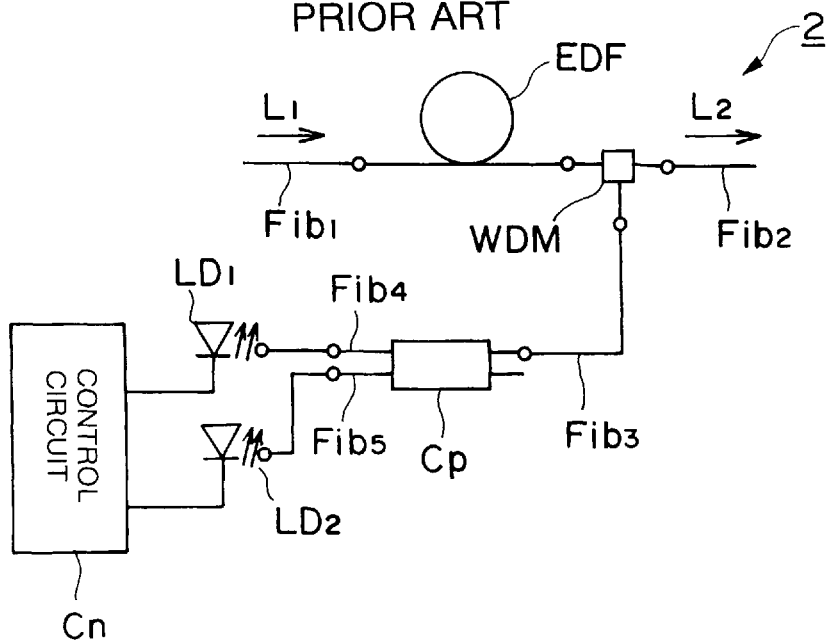
FIG. 13 is a block diagram of a conventional optical amplifier with redundant excitation light sources.

As shown in FIG. 13, in a conventional structure in which the excitation light is introduced to the EDF through only one optical fiber F extended from the output side of the optical coupler with 3 dB loss, the excitation light breaks through the cutting surface of the other optical fiber F to cause an excess loss. However, in the structure of the first embodiment, two optical fibers F5, F6 are extended from the output side of the optical coupler 25 and the excitation lights are introduced to the EDF 22 through the optical fibers F5, F6 from both sides, so that the excitation lights introduced to the optical coupler 25 are almost introduced to the EDF and the excess loss of the excitation light can be minimized.

Further, the control circuit 27 can control and balanced the currents supplied to the respective excitation light sources 11, 12. Therefore, it is possible to control the output total of the excitation lights introduced to the EDF 22 from the excitation light sources 11, 12 in a redundant structure to be constant.

Second Embodiment

Figure 5:
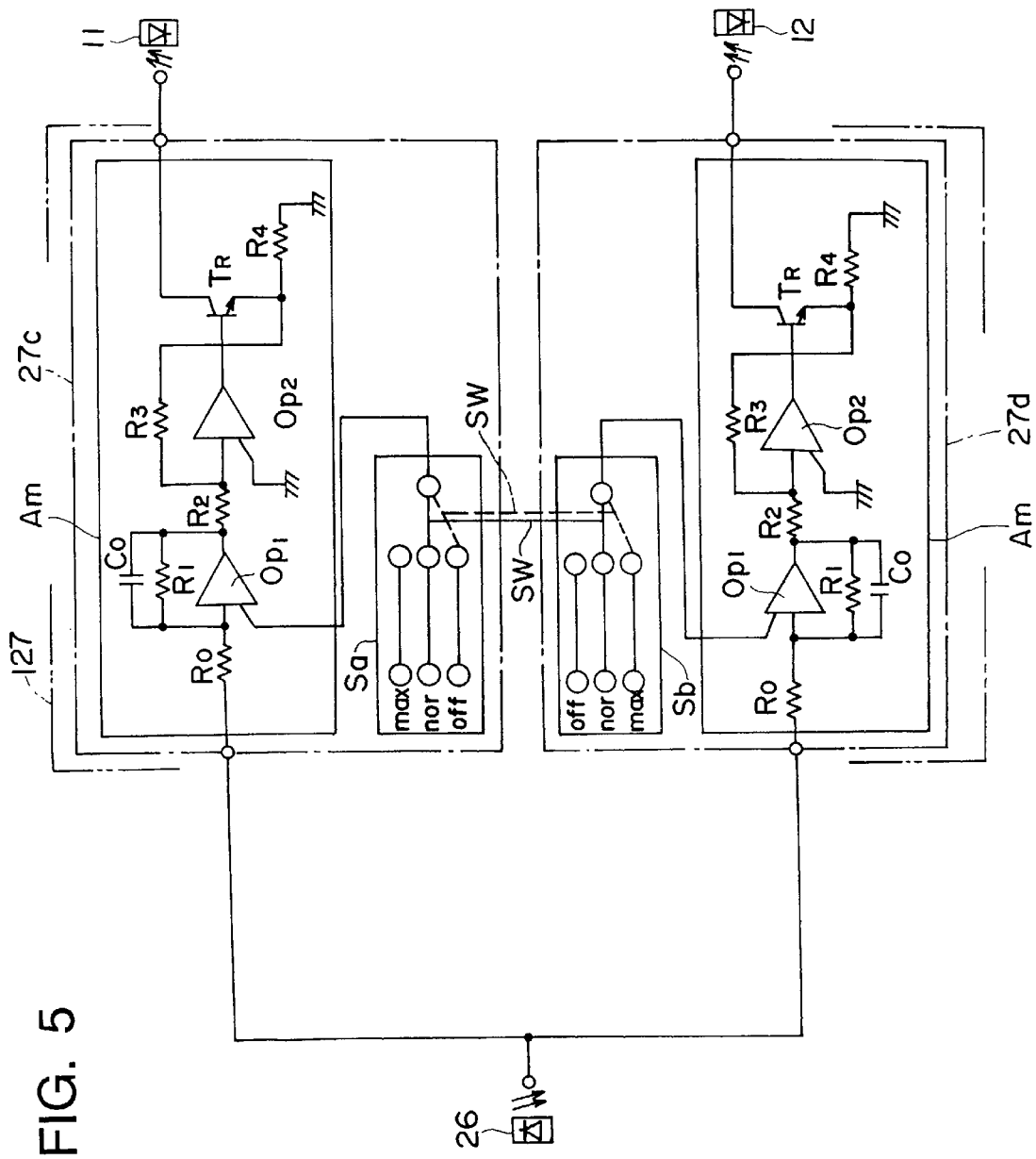
FIG. 5 is a block diagram illustrating an control circuit according to the second embodiment of this invention.

FIG. 5 is a block diagram showing a control circuit of the second embodiment according to the present invention.

An optical amplifier in the second embodiment has almost the same structure as the first embodiment shown in FIG. 1, and only control circuits are different. In FIG. 5, the same reference numerals are given to those components which are the same as the components in the first embodiment, and the explanations thereof are omitted.

The control circuit 127 is provided with a first control part 27c connected with the first excitation light source 11 and a second control part 27d connected with the second excitation light source 12. Both the first control part 27c and the second control part 27d are connected with the photo diode 26.

The first control part 27c is provided with a power supply circuit Am and a first current change-over part Sa, and controls a current supplied to the first excitation light source 11. The current change-over part Sa varies the current inputted to the non-inverting input in the operational amplifier Op1 in three steps. That is, the current outputted from the power circuit Am are varied in three steps including 100% of the stationary value (max), 50% of the stationary value (nor) and 0% (off).

The second control part 27d is provided with a power supply circuit Am and a second current change-over part Sb, and controls a current supplied to the second excitation light source 12. The current change-over part Sb varies the current inputted to the non-inverting input in the operational amplifier Op1 in three steps. That is, the current outputted from the power circuit Am are varied at three steps including 100% of the stationary value (max), 50% of the stationary value (nor) and 0% (off).

The first current change-over part Sa and the second current change-over part Sb correspond to a change-over circuit, and is provided with a switch SW to be changed over with an external instruction. The first current change-over part Sa and the second current change-over part Sb are changed over in the three steps in relation with each other with this switch SW.

Normally, both the first current change-over part Sa and the second current change-over part Sb are set positions at which currents supplied from the power supply circuit Am are 50% of the stationary value (nor). However, for example, when the first excitation light source 11 is unusable to be replaced, the first current change-over part Sa is set to "off" with the switch SW in accordance with an external instruction and at the same time the second current change-over part Sb is set to "max". Then, the current inputted from the first current change-over part Sa to the non-inverting input of the operational amplifier Op1 becomes zero, and the power supply circuit Am in the first control part 27c supplies no current to the first excitation light source 11. On the contrary, the current inputted from the second current change-over part Sb to the non-inverting input of the operational amplifier Op2 becomes "max", and the power supply circuit Am in the second control part 27d supplies the 100% current of the stationary value to the second excitation light source 12. And, when the second excitation light source 12 is replaced, the first current change-over part Sa is set to "max" with the switch SW and at the same time the second current change-over part Sb is set to "off". Then, the current inputted from the first current change-over part Sa to the non-inverting input of the operational amplifier Op1 becomes "max", and the power supply circuit Am in the first control part 27c supplies the 100% current of the stationary value to the first excitation light source 11. On the contrary, the current inputted from the second current change-over part Sb to the non-inverting input of the operational amplifier Op2 becomes zero, and the power supply circuit Am in the second control part 27d supplies no current to the second excitation light source 12.

Next, the explanation will be given of the control to keep the total of the currents outputted to the respective excitation light sources 11, 12 at the stationary value with the respective control part 27c, 27d.

Figure 6:
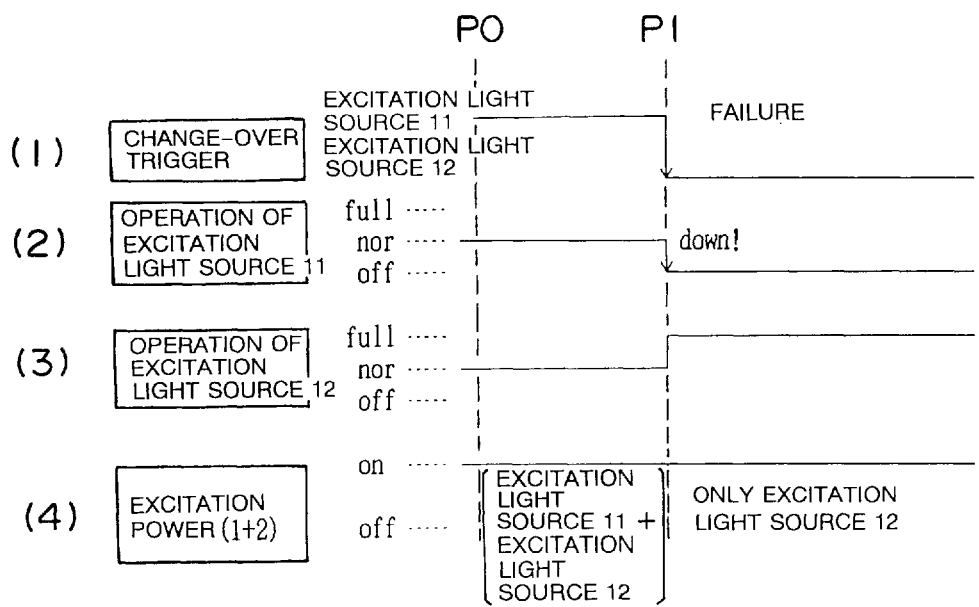
FIG. 6 is a time chart explaining a replacement of the excitation light sources shown in FIG. 4.

FIG. 6 is a time chart for explaining the replacement of the first excitation light source 11.

At the point P0, the first excitation light source 11 and the second excitation light source 12 output the excitation lights at 50% of the stationary value each and the total thereof is inputted to the optical amplification part 20. And, a part of the main signal branched with the monitor optical coupler 24 is converted to an electric signal with the photo diode 26, and the electric signal is inputted to the control circuit 127. With this arrangement, based on the electric signal from the photo diode 26, the first control part 27c and the second control part 27d supply the 50% current of the stationary value each to the first excitation light source 11 and the second excitation light source 12 (refer to (2), (3) in FIG. 6). At that time, both the current change-over part Sa and the current change-over part Sb are set to "nor" with the switch SW in the control circuit 127.

At the point P1, when a signal for changing over from the first excitation light source 11 to the second excitation light source 12 (change-over trigger signal) is inputted ((1) in FIG. 5), the first current change-over part Sa is set to "off" and at the same time the second current change-over part Sb is set to "max" (refer to a dot line in FIG. 5). Then, the current inputted from the first current change-over part Sa to the non-inverting input of the operational amplifier Op1 becomes zero. That is, the power supply circuit Am in the first control part 27c reduces the current supplied to the first excitation light source 11 from 100% to 50% of the stationary value. On the contrary, the current inputted from the second current change-over part Sb to the non-inverting input of the operational amplifier Op1 becomes "max". Therefore, the power supply circuit Am in the second control part 27d raises the from 50% to 100% of the stationary value ((3) in FIG. 6). As the result, at the point P1, the excitation light is introduced to the EDF 22 only from the second excitation light source 12 ((4) in FIG. 6).

The control circuit 127 controls the respective excitation light sources 11, 12 in a manner that the second excitation light source 12 outputs the 100% excitation light of the stationary value without outputting the excitation light from the first excitation light source 11. After the point P1, when the output of the excitation light to the optical amplifier 10 is kept at the stationary value with only the second excitation light source 12, the sub-substrate mounted with the first excitation light source 11 can be replaced for new one.

As above described, usually, the optical amplifier 20 receives the excitation light in which the respective excitation lights at 50% of the stationary value from the first excitation light source 11 and the second excitation light source 12 are doped, and when one of the excitation light sources is replaced for new one, the output of another excitation light source can be changed over from 50% to 100% of the stationary value, so that the excitation light sources can be changed unless the output total of the excitation light becomes zero.

Third Embodiment

Figure 7:
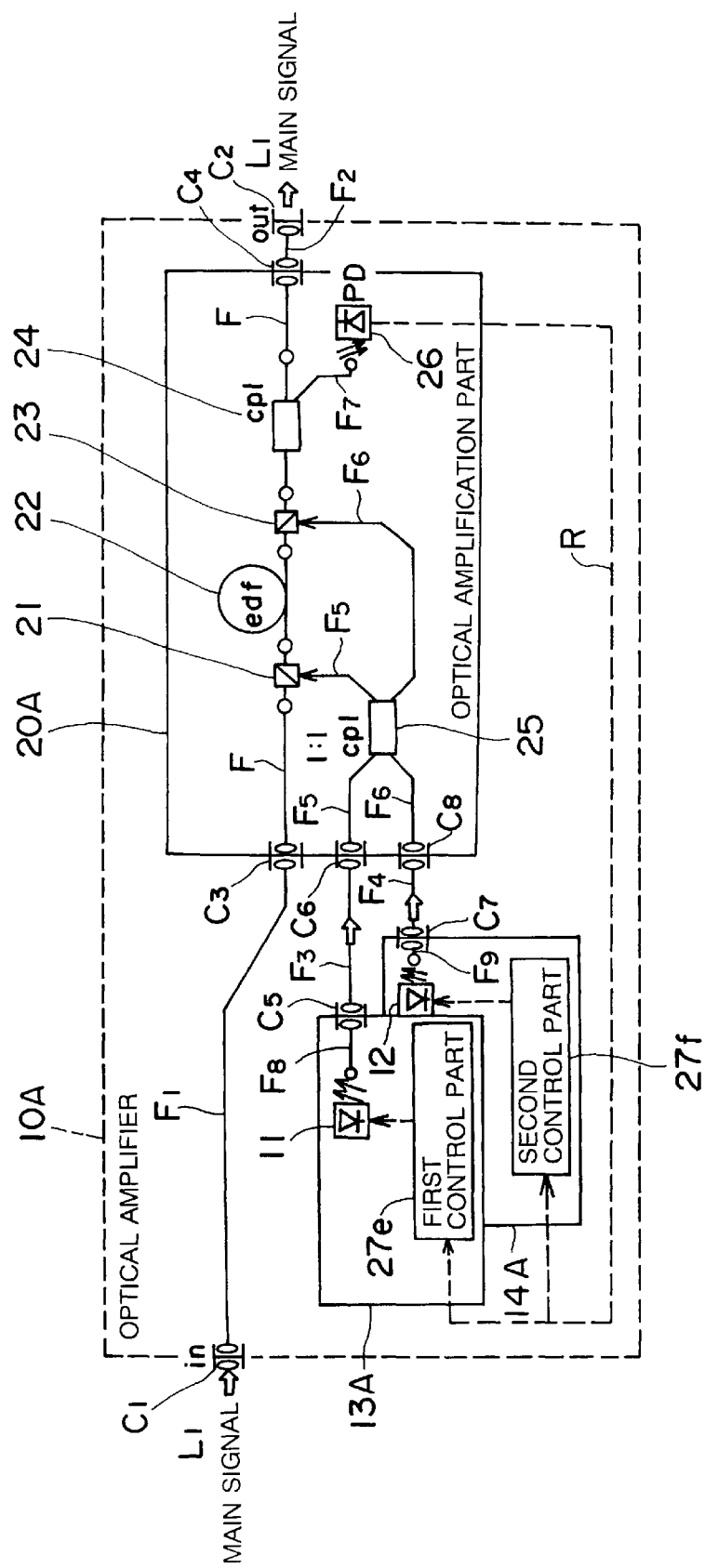
FIG. 7 is a is a block diagram illustrating an optical amplifier according to the third embodiment of this invention.

FIG. 7 is a block diagram showing an optical amplifier in the third embodiment.

The difference between the optical amplifier 10 in the first embodiment and the optical amplifier 10A in the third embodiment is that in the first embodiment the control circuit 27 including the respective control parts 27a, 27b is provided on the sub-substrate whereas in the third embodiment a first control part 27e and the second control part 27f which are provided with the same functions as those of the first control part 27a and the second control part 27b are mounted on the sub-substrates of the optical amplifier 20A, respectively. In FIG. 7, the same reference numerals are given to the same components as those in FIG. 1, and the detail explanations thereof are omitted.

Provided on the sub-substrate for the first excitation light source 13A, the first excitation light source 11 connected with the optical connector C5 through the optical fiber F8 and the first control part 27e for controlling the first excitation light source 11. Provided on the sub-substrate for the second excitation light source 14A, the second excitation light source 12 connected with the optical connector C7 through the optical fiber F9 and the second control part 27f for controlling the second excitation light source 12. The respective excitation light sources 11, 12 are controlled by the first control part 27e and the second control part 27f and supplied with the current.

The photo diode 26 is connected with the monitor optical coupler 24 through the optical fiber F7 and connected with the first control part 27e and the second control part 27f through the signal conductor R. A part of the main signal branched by the monitor optical coupler 24 is converted to an electric signal to output to the first control part 27e and the second control part 27f.

In addition, the first excitation light source 11 and the second excitation light source 12 are provided in a redundant configuration with the same characteristics. When one excitation light source is in trouble, another is used instead of the one and the excitation light source in trouble is replaced for new one. When the first excitation light source 11 is replaced, the optical fiber F8 connected to the optical connector C5 is cut off and the first excitation light source part 13A is taken off from the optical amplifier 10A together with the sub-substrate, whereby the first excitation light source 11 can be replaced. And, when the second excitation light source 12 is replaced, the optical fiber F9 connected to the optical connector C7 is cut off and the second excitation light source part 14A is taken off from the optical amplifier 10A together with the sub-substrate, whereby the second excitation light source 11 can be replaced.

According to the optical amplifier 10A in the third embodiment, the control parts 27e, 27f are provided on the sub-substrates for the excitation light sources 13A, 14A, respectively, so that the sub-substrate for the optical amplification part 20A is provided with only optical circuit elements with high reliability, such as the optical multiplexers 21, 23 and the couplers 24, 25. With this arrangement, the optical amplification part 20A will not be in trouble for a long term, so that the maintenance becomes easy.

And, according to the optical amplifier 10A in the third embodiment, the control parts are provided in a redundant configuration same as the excitation light sources, so that the reliability increases all over the optical amplifier 10A.

Fourth Embodiment

Figure 8:
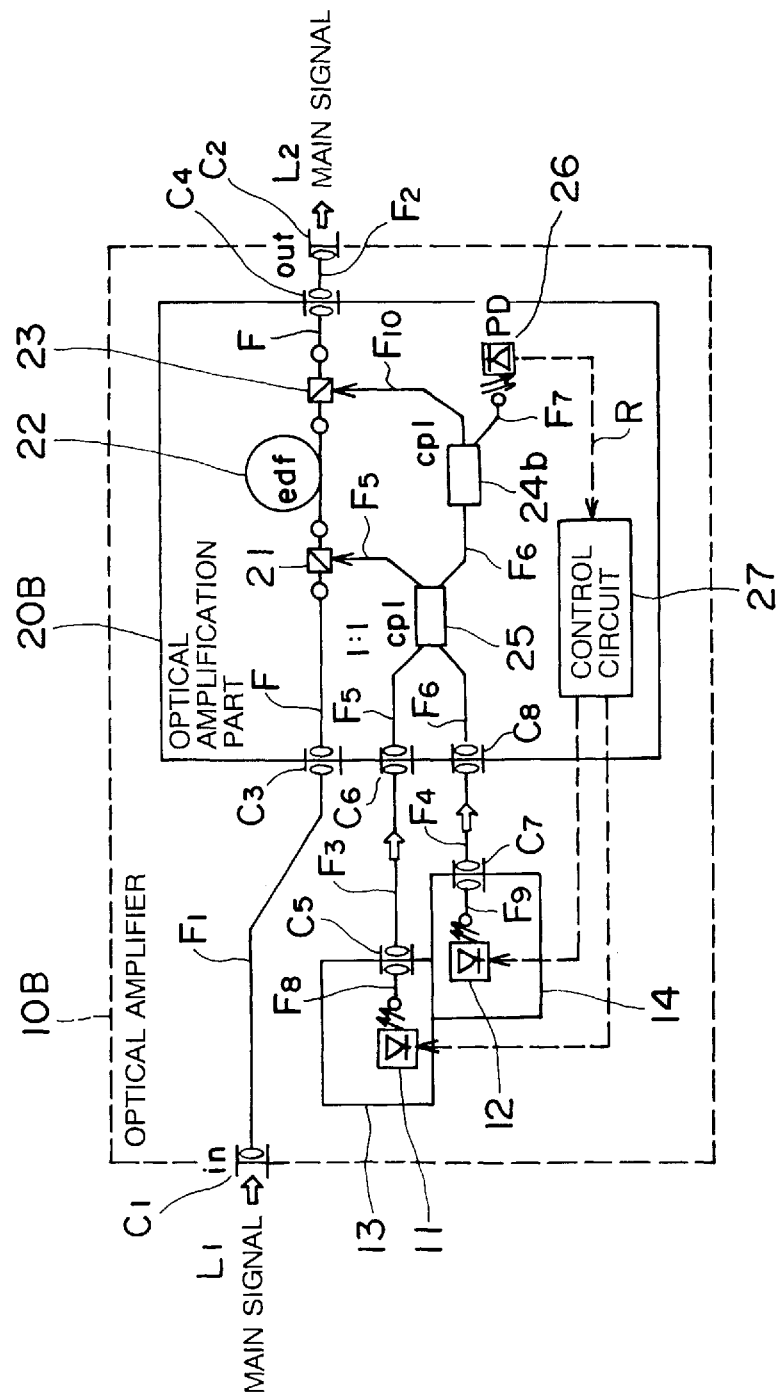
FIG. 8 is a block diagram illustrating an optical amplifier according to the fourth embodiment of this invention.

FIG. 8 is a block diagram showing an optical amplifier according to the fourth embodiment of the present invention.

The difference between the optical amplifier 10B according to the forth embodiment shown in FIG. 8 and the optical amplifier 10 according to the first embodiment shown in FIG. 1 is the connection position of the monitor optical coupler 24. In FIG. 1, the monitor optical coupler 24 is provided on the transmission path of the main signal between the rear optical multiplexer 23 and the optical connector C4, however, in FIG. 7, the monitor optical coupler 24b is provided on the optical path between the output side of the optical coupler 25 and the rear optical multiplexer 23 through the optical fibers F6, F10. In addition, in FIG. 8, the same components as those in FIG. 1 are given the same reference numerals and the explanations thereof are omitted.

The monitor optical coupler 24b is connected with the output side of the optical coupler 25 through the optical fiber F6 and with the rear optical multiplexer 25 through the optical fiber F10. The monitor optical coupler 24b is an optical circuit element to branch a part of the input light for monitoring. The monitor optical coupler 24b branches the input light in a ratio of ten-to-one to send the excitation light outputted from the optical coupler 25 to the rear multiplexer 23 and the photo diode in a ratio of ten-to-one, respectively.

The photo diode 26 is connected with the monitor optical coupler 24b through the optical fiber F7 and with the control circuit 27 through the signal conductor R. The photo diode 26 converts the part of the excitation light branched by the monitor optical coupler 24b to an electric signal to output to the control circuit 27.

The control circuit 27 is the same as one of the control circuit 27 in the first embodiment and the control circuit 127 in the second embodiment, and controls to keep the output total of the respective excitation light sources 11, 12 at a stationary value.

The optical amplifier 10B introduces one side excitation light branched by the optical coupler 25 directly to the EDF 22 and the other side through the monitor optical coupler 24b to the EDF 22, and excites the EDF 22 from both side.

And, in the optical amplifier 10B, the one side excitation light branched equally by the optical coupler 25 is sent to the front optical multiplexer 21 through the optical fiber F5 and the other side is sent to the monitor optical coupler 24b through the optical fiber F6. Further, the part of the excitation light sent through monitor optical coupler 24 is sent to the photo diode 26, and the remaining excitation light is sent to the rear optical multiplexer 23. That is, the excitation light for inputting to the EDF 22 from the input side of the main signal is larger than that from the output side of the main. Therefore, in the optical amplifier 10B according to the fourth embodiment, though the EDF 22 is excited from both side, there is little noise caused by the interference between the main signal and the excitation light, so that a low noise optical amplifier can be provided.

Fifth Embodiment

Figure 9:
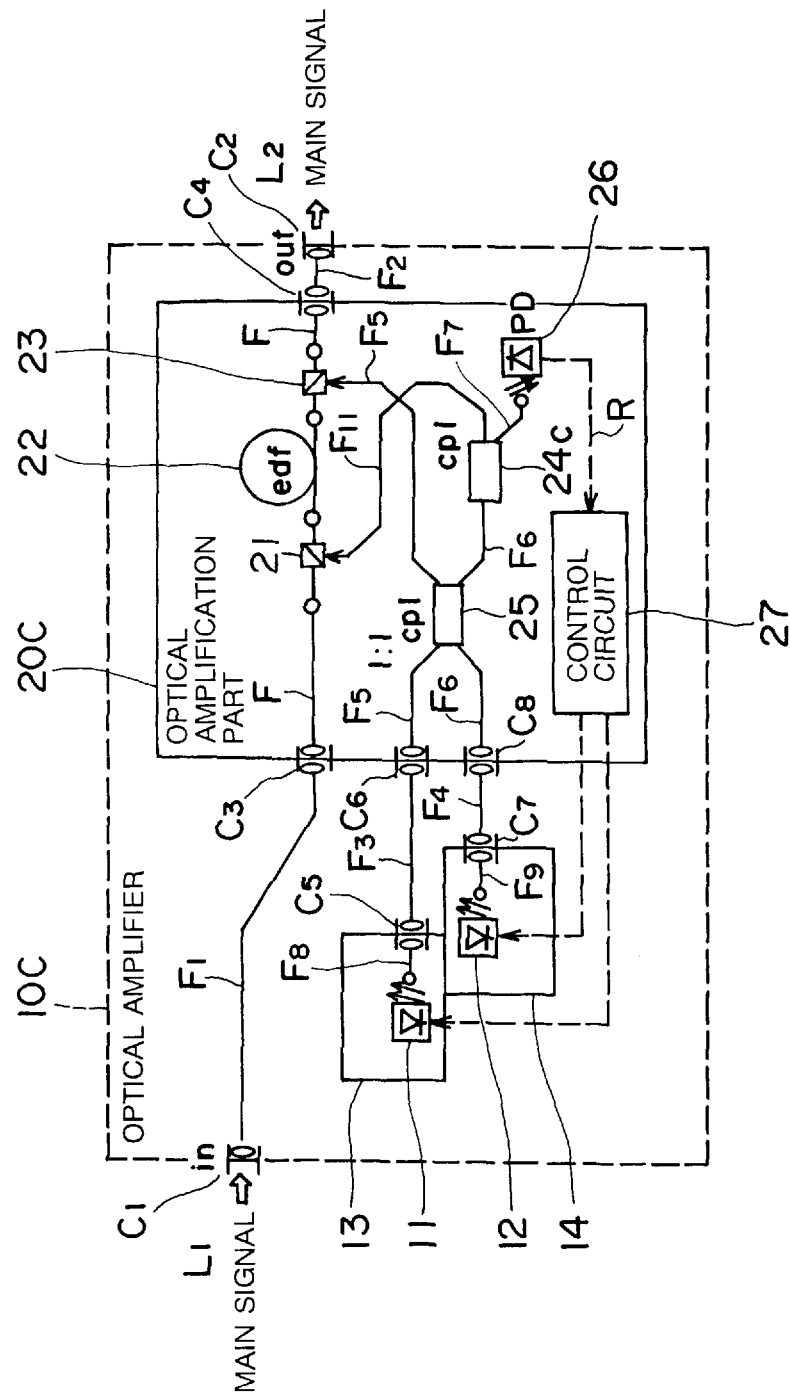
FIG. 9 is a block diagram illustrating an optical amplifier according to the fifth embodiment of this invention.

FIG. 9 is a block diagram showing an optical amplifier 10C according to the fifth embodiment of the present invention.

The difference between the optical amplifier 10C according to the fifth embodiment shown in FIG. 8 and the optical amplifier 10 according to the first embodiment shown in FIG. 1 is the connection position of the monitor optical coupler. In FIG. 1, the monitor optical coupler 24 is provided between the rear optical multiplexer 23 and the optical connector C4, however, in FIG. 9, the monitor optical coupler 24c is provided between the optical coupler 25 and the front optical multiplexer 25. In addition, in FIG. 9, the same components as those in FIG. 1 are given the same reference numerals and the explanations thereof are omitted.

The monitor optical coupler 24c is connected with the output side of the optical coupler 25 through the optical fiber F6 and with the rear optical multiplexer 21 through the optical fiber F11. The monitor optical coupler 24b is an optical circuit element to branch a part of the input light for monitoring. The monitor optical coupler 24b branches the input light in a ratio of ten-to-one to send the excitation light outputted from the optical coupler 25 to the front multiplexer 21 and the photo diode 26 in a ratio of ten-to-one, respectively.

The photo diode 26 is connected with the monitor optical coupler 24c through the optical fiber F7 and with the control circuit 27 through the signal conductor R. The photo diode 26 converts the part of the excitation light branched by the monitor optical coupler 24c to an electric signal to output to the control circuit 27.

The control circuit 27 is the same as one of the control circuit 27 in the first embodiment and the control circuit 127 in the second embodiment, and controls to keep the output total of the respective excitation light sources 11, 12 at a stationary value.

The optical amplifier 10C introduces one side excitation light branched by the optical coupler 25 directly to the EDF 22 and the other side through the monitor optical coupler 24b to the EDF 22, and excites the EDF 22 from both side.

And, in the optical amplifier 10C, the one side excitation light branched equally by the optical coupler 25 is sent to the rear optical multiplexer 23 through the optical fiber F5 and the other side is sent to the monitor optical coupler 24c through the optical fiber F6. Further, a part of the excitation light sent through monitor optical coupler 24c is sent to the photo diode 26, and the remaining excitation light is sent to the front optical multiplexer 21. That is, the excitation light for inputting to the EDF 22 from the input side of the main signal is larger than that from the output side of the main. Therefore, in the optical amplifier 10C according to the fifth embodiment, the maim signal and the excitation light interfere each other thereby to make the amplification larger, so that an high output optical amplifier can be provided.

Sixth Embodiment

Figure 10:
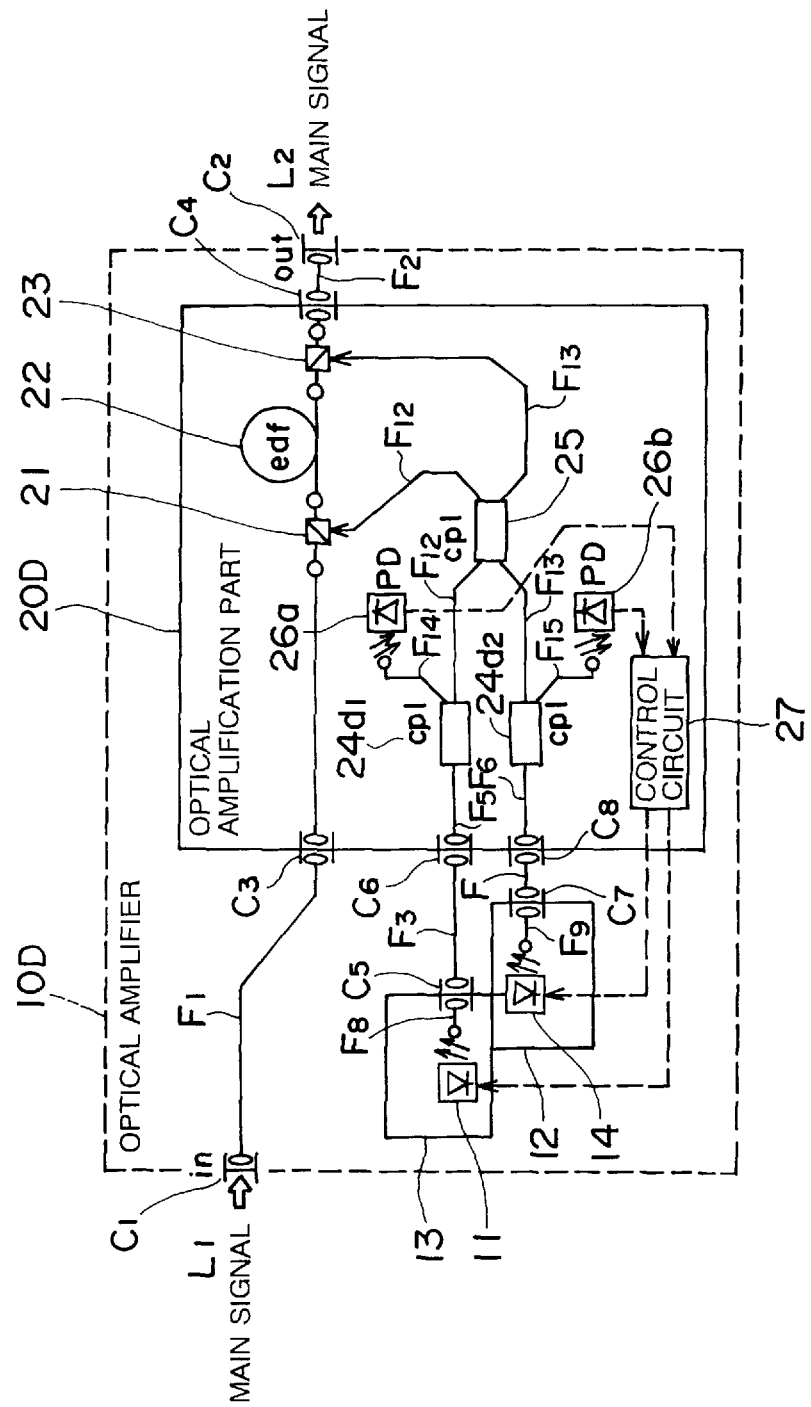
FIG. 10 is a block diagram illustrating an optical amplifier according to the sixth embodiment of this invention.

FIG. 10 is a block diagram showing an optical amplifier 10D according to the sixth embodiment of the present invention.

The optical amplifier 10C according to the fifth embodiment shown in FIG. 10 differs from the optical amplifier 10 according to the first embodiment shown in FIG. 1 in two points that two monitor optical couplers are provided and two photo diodes are provided. In FIG. 10, the first monitor optical coupler 24d1 and the second optical coupler 24d2 are provided between the connecters C6, C8 connected with the excitation light sources 11, 12 and the optical coupler 23, respectively, and the first photo diode 26a and the second photo diode 26b are placed at the positions at which excitation lights branched by the monitor optical coupler 24d1 and the monitor optical coupler 24d2 are introduced through the optical fibers F14, F15, respectively. In addition, in FIG. 10, the same components as those in FIG. 1 are given the same reference numerals and the explanations thereof are omitted.

The first monitor optical coupler 24d1 is connected with the connecter C6 through the optical fiber F5 and with the optical coupler 25 through the optical fiber F12. The monitor optical coupler 24d1 is an optical circuit element to branch a part of the input light for monitoring. For example, the monitor optical coupler 24b branches the input light in a ratio of ten-to-one to send the excitation light outputted from the first excitation light source 11 to the optical coupler 25 and the first photo diode 26a in a ratio of ten-to-one, respectively. The first photo diode 26a is connected with the first monitor optical coupler 24d1 through the optical fiber F14 and with the control circuit 27 through the signal conductor R. The first photo diode 26a converts the part of the excitation light branched by the monitor optical coupler 24c to an electric signal to output to the control circuit 27.

The second monitor optical coupler 24d2 is connected with the connecter C8 through the optical fiber F6 and with the optical coupler 25 through the optical fiber F13. The second monitor optical coupler 24d2 is an optical circuit element to branch a part of the input light for monitoring. For example, the second monitor optical coupler 24d2 branches the input light in a ratio of ten-to-one to send the excitation light outputted from the second excitation light source 12 to the optical coupler 25 and the second photo diode 26b in a ratio of ten-to-one, respectively. The second photo diode 26b is connected with the second monitor optical coupler 24d2 through the optical fiber F15 and with the control circuit 27 through the signal conductor R. The second photo diode 26b converts the part of the excitation light branched by the monitor optical coupler 24c to an electric signal to output to the control circuit 27.

The control circuit 27 is the same as one of the control circuit 27 in the first embodiment and the control circuit 127 in the second embodiment, and controls to keep the output total of the respective excitation light sources 11, 12 at a stationary value.

In the optical amplifier 10D of the sixth embodiment, the excitation lights sent from the respective excitation light sources 11, 12 are monitored directly, it can become aware instantly that a fault occurs in one of the excitation light sources 11, 12.

Seventh Embodiment

Figure 11:
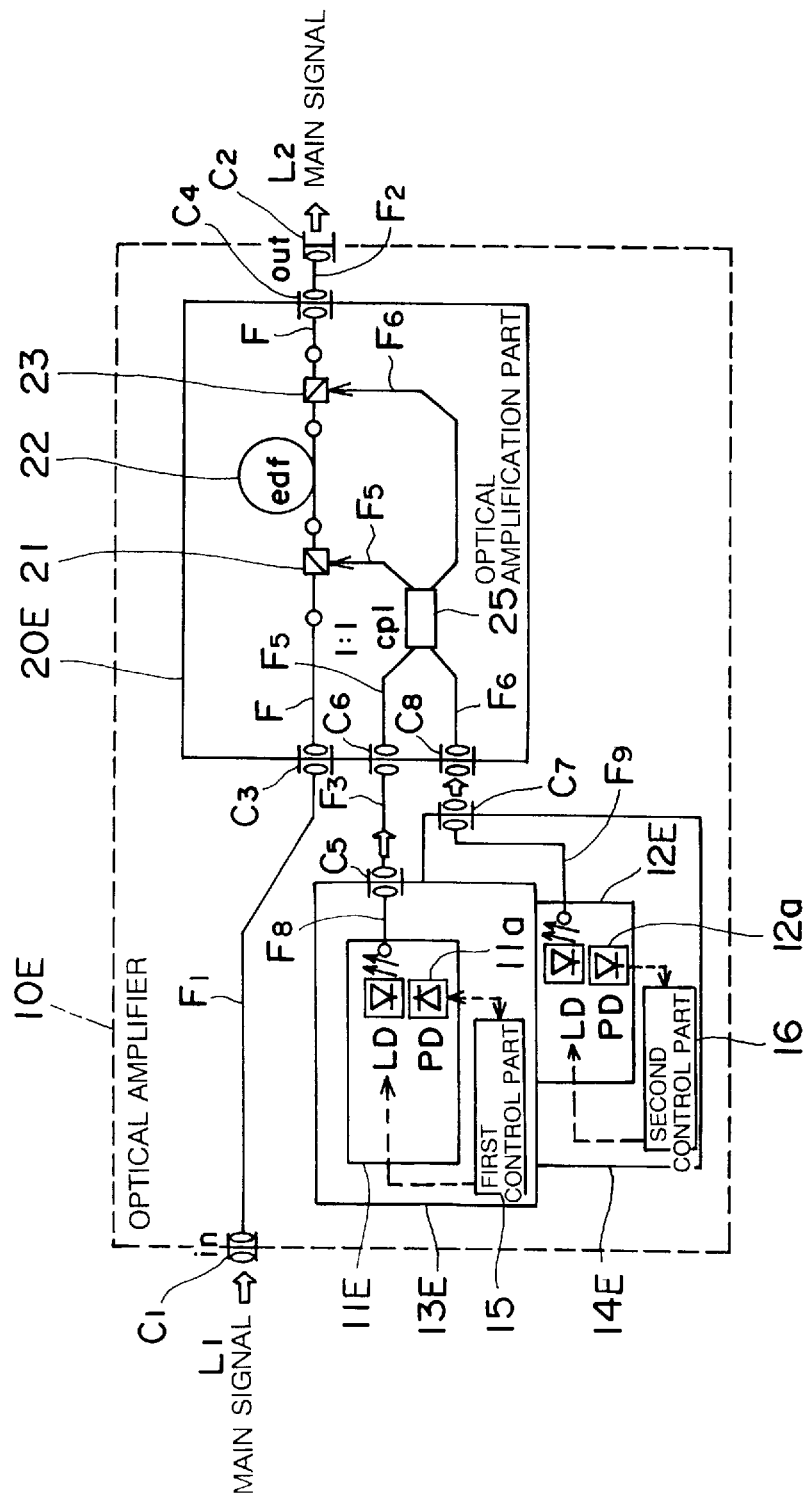
FIG. 11 is a block diagram illustrating an optical amplifier according to the seventh embodiment of this invention.
Figure 12:
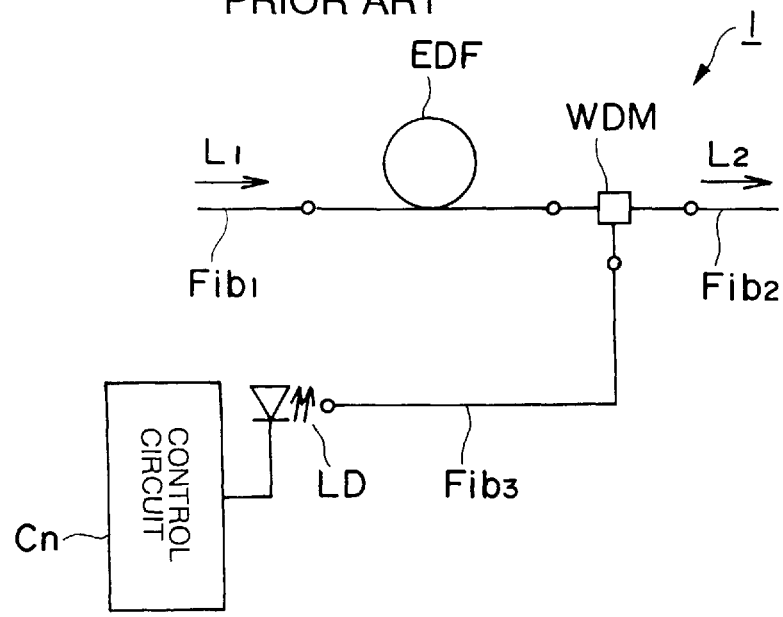
FIG. 12 is a block diagram of a conventional optical amplifier.

FIG. 11 is a block diagram showing an optical amplifier 10E according to the seventh embodiment of the present invention.

The optical amplifier 10E according to the seventh embodiment shown in FIG. 11 differs from the optical amplifier 10 according to the first embodiment shown in FIG. 1 in points that photo diodes 11a, 12a are built in the excitation light sources 11E, 12E, respectively, and the control parts 15, 16 are provided on the sub-substrates for the excitation light sources 13E, 14E, respectively. The output volumes of the back beams from the excitation lights outputted from the respective excitation light sources 11E, 12E are monitored and the respective control parts 15, 16 control the outputs of the excitation light sources 11E, 12E. In addition, in FIG. 11, the same components as those in FIG. 1 are given the same reference numerals and the explanations thereof are omitted.

The first excitation light source 11E, the photo diode 11a built in the excitation light source 11E and the first control part 15 are provided on the sub-substrate for the first excitation light source 13E. The second excitation light source 12E, the photo diode 12a built in the excitation light source 12E and the second control part 16 are provided on the sub-substrate for the second excitation light source 14E.

The respective photo diodes 11a, 12a convert the back beams of the excitation lights from the excitation light sources 11E, 12E 26 to electric signals to output to the respective control parts 15, 16. The control parts 15, 16 are the same as one of the control circuit 27 in the first embodiment and the control circuit 127 in the second embodiment, and controls to keep the output total of the respective excitation light sources 11E, 12E at a stationary value.

In the optical amplifier 10D of the seventh embodiment, the excitation lights sent from the respective excitation light sources 11E, 12E are monitored directly, it can become aware instantly that a fault occurs in the excitation light sources 11E, 12E.

According to the present invention, in an optical amplifier with redundant excitation light sources for exciting the EDF, though an optical coupler, which couples the excitation lights from plural excitation light sources and then branches the coupled light, is used, the loss of the excitation light after branch can be minimized and the excitation light can be introduced to the EDF efficiently so that it can be used for the amplification effectively. Further, it is unnecessary to use a special element such as a polarization type coupler, so that non-expensive optical amplifier can be provided. And, while the output total of the excitation light, which is introduced to the EDF, is kept at a constant value, the excitation light source which outputs an excitation light is changed from one to another without the output total of the excitation lights becomes zero.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An optical amplifier comprising:
   a rare earth doped optical fiber excited by excitation lights and amplifying an optical signal input to the rare earth doped optical fiber;
   a first excitation light source and a second light source outputting said excitation lights;
   an optical coupler combining said excitation lights output from said first excitation light source and said second excitation light source together and equally dividing the combined excitation lights into at least two divided excitation lights;
   a first excitation light coupler introducing one of said divided excitation lights to one end of said rare earth doped optical fiber; and
   a second excitation light coupler introducing a different one of said divided excitation lights to another end of said rare earth doped optical fiber.

2. The optical amplifier according to claim 1, further comprising:
   an excitation light branching coupler branching one of said excitation lights output from said first excitation light source and said second excitation light source;
   an optical/electric signal converter converting a branched excitation light branched by said excitation light branching coupler into an electric signal; and
   a control part controlling said first excitation light source or said second excitation light source in accordance with said electric signal.

3. The optical amplifier according to claim 1, further comprising;
   an optical signal branching coupler branching said optical signal output from one end of said rare earth doped optical fiber;
   an optical/electric signal converter converting said branching optical signal branched by said excitation light branching coupler into an electric signal;
   a controller controlling said first excitation light source and said second excitation light in accordance with said electric signal.

4. The optical amplifier according to claim 2, wherein said excitation light branching circuit is provided between said optical coupler and said first excitation light coupler.

5. The optical amplifier according to claim 2, wherein said excitation light coupler is provided between said optical coupler and said second excitation light coupler.

6. The optical amplifier according to claim 2, wherein said excitation light coupler is provided between said first excitation light source and said optical coupler and said excitation light coupler is between said second excitation light source and said optical coupler.

7. An optical amplifier according to claim 1, wherein said first excitation light source and said second excitation light source are laser diodes.

8. The optical amplifier according to claim 1, further comprising:
an optical/electric signal converter converting a part of said excitation lights output from said first excitation light source and said second excitation light source, respectively, into an electric signal;
a control part controlling said first excitation light source and said second excitation light source in accordance with said electric signal.

9. The optical amplifier according to claim 1, wherein:
said rare earth doped optical fiber, said optical coupler, said first excitation light coupler and said second excitation light coupler are put on a first substrate;
said first excitation light source is put on a second substrate;
said second excitation lights source is put on a third substrate;
said second substrate and said first substrate are freely attachable and detachable and said third substrate and said first substrate are freely attachable and detachable.

10. The optical amplifier according to claim 2, wherein:
said rare earth doped optical fiber, said optical coupler, said first excitation light coupler and said second excitation light coupler, said excitation light branch part and said optical/electric conversion part are put on a first substrate;
said first excitation light source and a first control part for controlling said first excitation light are put on a second substrate;
said second excitation lights source and a second control part for controlling said second excitation light source are put on a third substrate;
said second substrate and said first substrate are freely attachable and detachable and said third substrate and said first substrate are freely attachable and detachable.

11. The optical amplifier according to claim 2, wherein said control part comprises,
a power circuit for adjusting said electric signal so as to be a stationary value and for supplying currents to said first excitation light source and said second excitation light source, and,
a time constant circuit, when one excitation light source is changed over to other excitation light source, for controlling said power circuit in a manner that a current supplied to said one excitation light source is decreased gradually from a change-over time in a predetermined time and in a manner that said current supplied to said other excitation light source is increased gradually from said change-over time in said predetermined time.

12. The optical amplifier according to claim 2, wherein said control part comprises,
a power circuit for adjusting said electric signal so as to be a stationary value and for supplying drive currents to said first excitation light source and said second excitation light source, and,
a switch circuit for controlling said power circuit so as to function in a state selected among a first state in that currents supplied to said first excitation light source and said second excitation light source are set to a predetermined amount, respectively, a second state in that a current supplied to said first excitation light source is set to twice said predetermined amount and a current supplied to said second excitation light source is set to zero and a third state in that a current supplied to said first excitation light source is set to zero and a current supplied to said second excitation light source is set to twice said predetermined amount.

13. An optical transmission system, comprising:
a terminal station providing an optical signal to one end of an optical fiber line; and
a repeater connected to another end of the optical fiber line and amplifying the optical signal provided to the optical fiber line by the terminal station, the repeater including
a rare earth doped optical fiber having first and second ends, and
an optical coupler, optically connected to a first light source and a second light source which produce a first excitation light and a second excitation light, respectively, the optical coupler combining the first and second excitation lights together and equally dividing the combined excitation lights into at least two divided excitation lights, one of said at least two divided excitation lights being provided to the first end of the rare earth doped optical fiber and another of said at least two divided excitation lights being provided to the second end of the rare earth doped optical fiber, for amplifying the optical signal.

14. An optical transmission system, comprising:
a repeater connected to an optical fiber line and amplifying an optical signal travelling through the optical fiber line, the repeater including
a rare earth doped optical fiber having first and second ends, and
an optical coupler, optically connected to a first light source and a second light source which produce a first excitation light and a second excitation light, respectively, the optical coupler combining the first and second excitation lights together and equally dividing the combined excitation lights into at least two divided excitation lights, one of said at least two divided excitation lights being provided to the first end of the rare earth doped optical fiber and another of said at least two divided excitation lights being provided to the second end of the rare earth doped optical fiber, for amplifying the optical signal; and
a terminal station receiving the amplified optical signal from the optical fiber line.

15. An optical transmission system, comprising:
a output terminal station providing an optical signal to an optical fiber line;
a repeater amplifying the optical signal as the optical signal travels through the optical fiber line; and
a receiving terminal station receiving the amplified optical signal from the optical fiber line, wherein the repeater includes
a rare earth doped optical fiber having first and second ends, and
an optical coupler, optically connected to a first light source and a second light source which produce a first excitation light and a second excitation light, respectively, the optical coupler combining the first and second excitation lights together and equally dividing the combined excitation lights into at least two divided excitation lights, one of said at least two divided excitation lights being provided to the first end of the rare earth doped optical fiber and another of said at least two divided excitation lights being provided to the second end of the rare earth doped optical fiber, for amplifying the optical signal.

16. An apparatus comprising:

a rare earth doped optical fiber having two ends; and an optical coupler, optically connected to a first light source and a second light source which produce first and second excitation lights, respectively, the optical coupler combining the first and second excitation lights together and equally dividing the combined excitation lights into at least two light beams, at least one of said at least two light beams being provided to each end of the rare earth doped optical fiber.

17. An apparatus according to claim 16, further comprising:

a first excitation light introduction part introducing one of said at least two light beams to one end of said rare earth doped optical fiber; and a second excitation light introduction part introducing another of said at least two light beams to the other end of said rare earth doped optical fiber.

18. An optical amplifier comprising:

a rare earth doped optical fiber having first and second ends, an optical signal travelling through the optical fiber from the first end to the second end;

first and second excitation light sources producing first and second excitation lights, respectively;

an optical coupler combining the first and second excitation lights into a combined light, and equally dividing the combined light into first and second divided excitation lights;

a first light coupler introducing the first divided excitation light to the optical fiber through the first end of the optical fiber; and a second light coupler introducing the second divided excitation light to the optical fiber through the second end of the optical fiber, the first and second divided excitation lights exciting the optical fiber and thereby amplifying the optical signal as the optical signal travels through the optical fiber.

19. The optical amplifier according to claim 18, further comprising:

a branching coupler branching a portion of the first excitation light;

an optical/electric signal converter converting the branched portion into an electric signal; and a controller controlling said first excitation light source in accordance with the electric signal.

20. The optical amplifier according to claim 18, further comprising:

a branching coupler branching a portion of the second excitation light;

an optical/electric signal converter converting the branched portion into an electric signal; and a controller controlling said second excitation light source in accordance with the electric signal.

21. The optical amplifier according to claim 18, further comprising;

a branching coupler branching a portion of the optical signal after the optical signal travels through the optical fiber;

an optical/electric signal converter converting the branching portion into an electric signal; and a controller controlling the first and second excitation light sources in accordance with said electric signal.

22. An optical amplifier according to claim 18, wherein the first and second excitation light sources are laser diodes.

23. The optical amplifier according to claim 18, further comprising:

an optical/electric signal converter converting a portion of the first excitation light into a first electric signal, and converting a portion of the second excitation light into a second electric signal; and a controller controlling the first and second excitation light sources in accordance with the first and second electric signals, respectively.

24. An optical amplifier comprising:

a rare earth doped optical fiber having first and second ends, an optical signal travelling through the optical fiber from the first end to the second end;

an optical coupler combining first and second excitation lights into a combined light, and equally dividing the combined light into first and second divided excitation lights, wherein the first and second divided excitation lights are introduced to the optical fiber through the first end and second ends, respectively, of the optical fiber, to amplify the optical signal as the optical signal travels through the optical fiber.

* * * * *